Dec. 26, 1922.
L. KROHER.
Toy Riding Animal.
Filed Nov. 8, 1920
1,440,088
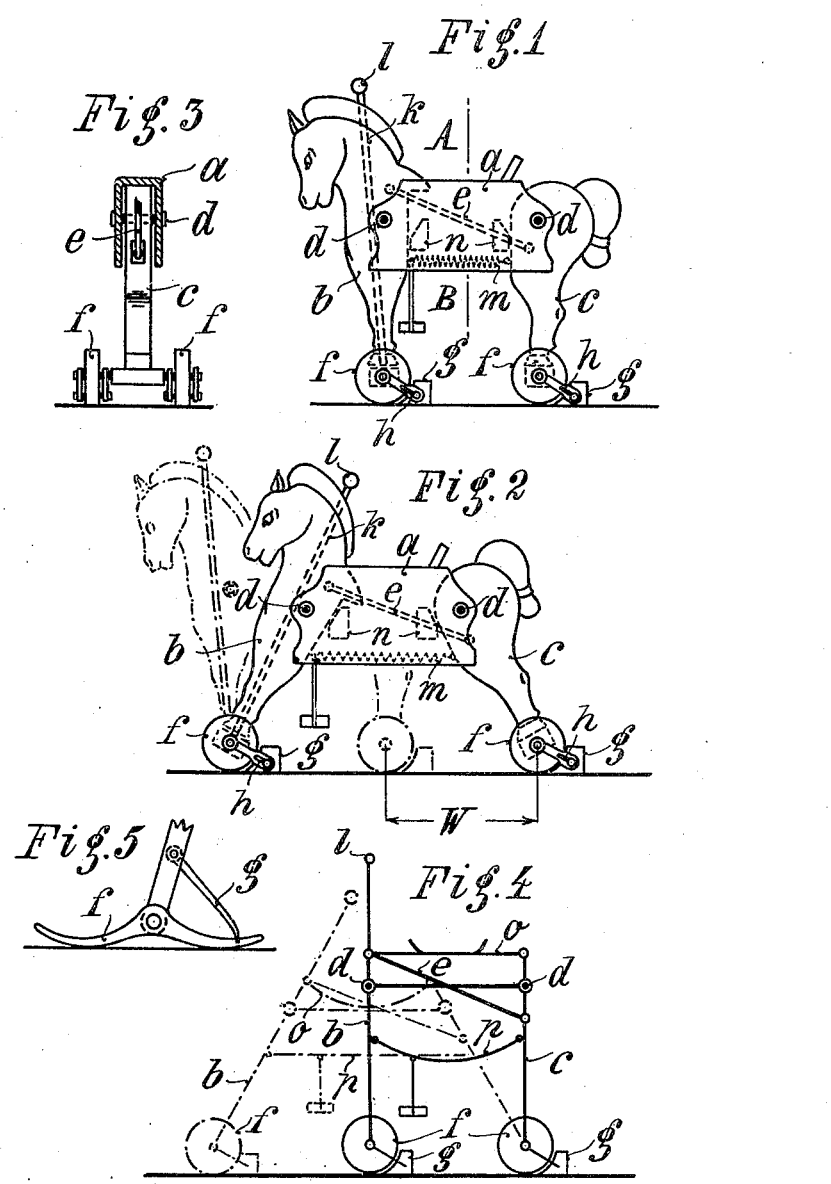
Inventor:
Ludwig Kroher
by Hebert J. Ry
Attorney Patented Dec. 26, 1922.

1,440,088

UNITED STATES PATENT OFFICE.

LUDWIG KROHER, OF MUNICH, BAVARIA, GERMANY.

TOY RIDING ANIMAL.

Application filed November 8, 1920. Serial No. 422,697.

*To all whom it may concern:*

Be it known that I, LUDWIG KROHER, a citizen of the German Republic and a resident of Munich, Bavaria, Germany, have invented certain new and useful Improvements in Toy Riding Animals, of which the following is a specification.

Toy-riding animals are known, in which the pairs of front and hind legs, which are oscillatingly secured on the body and are connected with each other by means of a brace-rod, are provided with ratchet wheels. The locomotion of these toy-riding-animals is effected by stretching out and then again contracting the pairs of legs.

My invention now relates to a toy-riding-animal of the kind described, but is characterized in view of the known devices by a simplified driving mechanism, as all interior mechanisms are dispensed with, without however diminishing in any manner the rigidity or carrying capacity of the body of the animal. A further advantage of the subject matter of the invention consists of the insignificant consumption of power for the locomotion of the animal and in the comfortable kind of motion, corresponding to the riding motion, whereby a premature fatigation is avoided and an effect is obtained, which promotes the purpose of amusement as well in amusing as in sporting regard.

In order to obtain the before mentioned advantages, the novelty of my invention consists therein, that the front part of the animal, which front part is composed of the front legs and the neck, is formed as a whole, and is pivotally secured to the body, said front part is further connected to the brace-rod leading to the rear end of the animal in such a manner, that the front part serves as driving member, which can be operated by a person sitting on the animal.

In the accompanying drawing, in which several embodiments of the subject matter of my invention are illustrated, Fig. 1 and 2 show the toy-riding-animal in side view in different operative positions.

Fig. 3 is a cross-section on line A—B of Fig. 1.

Fig. 4 shows in a diagrammatical manner a further embodiment of the invention and Fig. 5 illustrates a constructive detail.

The body $a$ of the riding-animal, which may represent any desired animal, for instance a horse, as shown in Figs. 1 and 2, is suitably constructed in the form of a box, see Fig. 3. The front legs together with the neck form the front part $b$, which acts as a double-lever adapted to turn around the pivot pin $d$. To the body $a$ further the rear end $c$ of the animal is secured in such a manner, that it can turn around the rear pivot pin $d$; the parts $b$ and $c$ are connected with each other by means of the brace-rod $e$ which is arranged within the interior of the box $a$. The brace rod $e$ engages with the front part $b$ somewhat above the front pivot pin $d$, so that the upper lever arm of the front part $b$ forms a favorably acting lever transmission. The feet of the animal are provided in the known manner with rollers $f$, and also with brake-blocks $g$, which are pivotally connected to the roller bearings by means of metal strips. In order to prevent that the brake-blocks stick to the periphery of the rollers, the brake-blocks are to some extent slidable in slots $h$ of the before mentioned metal strips. In the front part $b$ a guide-rod $k$ is rotatably arranged, said guide-rod having at its upper end a handle $l$, by means of which the front-wheels can be guided or steered.

The operation of my improved toy-riding-animal is as follows:

In the position of rest the toy-riding animal occupies the position shown in Fig. 1, into which position the animal is automatically moved by the spiral spring $m$, the ends of which are secured to the front part and to the rear end. If a person is sitting on the animal, the latter is displaced into the stretched position by the load of the rider in such a manner, that the front part and rear end then occupy the same slanting angular position, as may be seen from Fig. 2. The parts $b$ and $c$ now engage with stops $n$, provided within the interior of the body $a$, said stops limiting the oscillating movement of the parts $b$ and $c$. By causing the toy-riding-animal to assume the stretched position, only the front part $b$ is displaced, as the rear end $c$ engages with the brake blocks $g$ lying behind the rollers $f$ and is retained in position by the brake-blocks. If the weight of the rider should not be sufficient for obtaining the complete stretching position, the latter can be established by drawing back the front part *b* by means of the handle *l*. The front part is then again pushed forward, turning around its rollers *f*, which are now retained in position by their brake-blocks *g*, while the rear end *c* is not prevented from a forward movement and can roll forwardly, until the new position of rest is reached, as indicated in dotted lines in Fig. 2. The forward movement is accomplished by pushing forward the handle, whereby the front part of the toy-riding animal is caused to turn around its rollers *f*, a rearward movement of which is prevented by the brake-blocks *g*; this forward movement of the front part is transmitted to the rear end of the animal by means of the brace rod *e*. The toy-animal accordingly during the reciprocating movement of its front part has traveled the distance W. By the uniform operation of the front part *b* in this manner, a quick and shockless rolling on of the toy-riding-animal is obtained, the distance W being considerably increased at the rolling movement by the accelerated mass of animal and rider. For the purpose of traveling backward, it is only necessary to oscillate the brake-blocks *g* simply towards the other side of the rollers *f*, or for traveling on snow instead of the rollers short runners *f* can be provided (Fig. 5), which can be locked by means of a spreader *g*.

In Fig. 4 a form of construction is illustrated, in which the front part and rear end are connected with each other by means of straps or tapes *o*, *p*, the short tape *o* being located above and the longer tape *p* below the brace-rod *e*, so that the last named tape *p* in the position of rest of the animal is slackened, while the tape *o* is tensioned, as is shown in Fig. 4 in full lines. In the thereupon following stretching position the upper tape *o* is slackened and the lower tape *p* is tensioned, see the position shown in dotted lines in Fig. 4. The provision of special stops *n* can be dispensed with in this form of construction. By suitably arranging the pivot pins *d* in regard to each other, the movements can be adapted to the peculiarities of various animals.

Having thus particularly described the nature of my invention, what I claim as new and desire to secure by Letters Patent of the United States is:

1. Toy-riding-animal comprising in combination a box-shaped body, a front part, consisting of the pair of front-legs and the neck of the animal, a rear end, consisting of the pair of rear legs of the animal, said front part and rear end being pivotally connected to the body of the animal, and rigid means for connecting said front part and rear end with each other, said connecting means arranged within the interior of said box-shaped body engaging with the front part above its point of pivotal connection and with the rear end below its point of pivotal connection.

2. A toy-riding-animal, comprising in combination, a box-shaped body, a front part and a rear end, both pivotally connected to the body of the animal, rollers at the lower ends of said front part and rear end, brake-blocks, pivotally and to some extent slidably connected to said rollers, said brake-blocks being adapted to lock said foot-rollers in position, a guide-bar provided in the front part and serving for guiding the rollers of said front part, a handle at the upper end of said guide-bar and adapted to be moved back and forth and to transmit thereby a reciprocal movement to said front part, in case the weight of the rider is not sufficient for the locomotion of the animal, and flexible and rigid connecting means for connecting the front part and rear end with each other, said rigid connecting means arranged within the interior of said box-shaped body and engaging with the front part its point of pivotal connection and with the rear end below its point of pivotal connection.

In testimony whereof I affix my signature in presence of two witnesses.

LUDWIG KROHER.

Witnesses:
 FRANZ TRAUTMANN,
 MAX JÖRNER.